United States Patent
Miki et al.

(10) Patent No.: US 10,399,494 B2
(45) Date of Patent: Sep. 3, 2019

(54) VEHICLE-MOUNTED WARNING SYSTEM

(71) Applicant: DENSO CORPORATION, Kariya, Aichi-pref. (JP)

(72) Inventors: Nami Miki, Kariya (JP); Akihiro Ogasawara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/099,783

(22) PCT Filed: Feb. 27, 2017

(86) PCT No.: PCT/JP2017/007426
§ 371 (c)(1),
(2) Date: Nov. 8, 2018

(87) PCT Pub. No.: WO2017/199524
PCT Pub. Date: Nov. 23, 2017

(65) Prior Publication Data
US 2019/0135176 A1 May 9, 2019

(30) Foreign Application Priority Data

May 19, 2016 (JP) .................. 2016-100464

(51) Int. Cl.
| | |
|---|---|
| *F16H 63/42* | (2006.01) |
| *G08B 21/06* | (2006.01) |
| *B60Q 9/00* | (2006.01) |
| *B60K 35/00* | (2006.01) |
| *G06K 9/00* | (2006.01) |

(Continued)

(52) U.S. Cl.
CPC ............... *B60Q 9/00* (2013.01); *B60K 28/02* (2013.01); *B60K 35/00* (2013.01); *G06K 9/00221* (2013.01); *G07C 5/0825* (2013.01); *G10L 15/265* (2013.01); *G10L 25/63* (2013.01)

(58) Field of Classification Search
CPC ...................................................... B60Q 9/00
See application file for complete search history.

(56) References Cited

U.S. PATENT DOCUMENTS

| | | | | |
|---|---|---|---|---|
| 5,595,488 A | * | 1/1997 | Gozlan ................ | G09B 5/04 434/236 |
| 6,091,334 A | * | 7/2000 | Galiana ............... | G08B 21/06 340/439 |

(Continued)

FOREIGN PATENT DOCUMENTS

| | | |
|---|---|---|
| JP | 2004034893 A | 2/2004 |
| JP | 2005004414 A | 1/2005 |

(Continued)

*Primary Examiner* — Joseph H Feild
*Assistant Examiner* — Pameshanand Mahase
(74) *Attorney, Agent, or Firm* — Harness, Dickey & Pierce, P.L.C.

(57) ABSTRACT

A vehicle-mounted warning system which is configured such that a warning lamp on a meter panel is turned on or blinked in the event of an abnormality with a vehicle has a detection unit configured to detect a mental turmoil of a driver, when the warning lamp is turned on or blinked, and a notification unit configured to notify the driver of a content of the warning of the lit or blinking warning lamp or how to cope with the warning thereof, when the mental turmoil of the driver is detected.

6 Claims, 4 Drawing Sheets

(51) Int. Cl.
*G07C 5/08* (2006.01)
*G10L 25/63* (2013.01)
*G10L 15/26* (2006.01)
*B60K 28/02* (2006.01)

(56) References Cited

U.S. PATENT DOCUMENTS

| | | | | |
|---|---|---|---|---|
| 6,661,345 | B1 * | 12/2003 | Bevan | G08B 21/06 340/575 |
| 2008/0316009 | A1 * | 12/2008 | Nagata | B60K 35/00 340/438 |

FOREIGN PATENT DOCUMENTS

| | | |
|---|---|---|
| JP | 2006193138 A | 7/2006 |
| JP | 2006256377 A | 9/2006 |
| JP | 2008225216 A | 9/2008 |
| JP | 2011225189 A | 11/2011 |

* cited by examiner

| TYPE OF WARNING LAMP | WARNING LEVEL | |
|---|---|---|
| EXHAUST TEMPERATURE | 1 | HIGH RISK |
| WATER TEMPERATURE | 3 | LOW RISK |
| FUEL FILTER | 2 | MIDDLE RISK |
| OIL PRESSURE | 1 | HIGH RISK |
| ENGINE | 2 | MIDDLE RISK |
| AT | 1 | HIGH RISK |

VEHICLE-MOUNTED WARNING SYSTEM

CROSS REFERENCE TO RELATED APPLICATIONS

This application is a U.S. National Phase Application under 35 U.S.C. 371 of International Application No. PCT/JP2017/007426 filed on Feb. 27, 2017. This application is based on and claims the benefit of priority from Japanese Patent Application No. 2016-100464 filed on May 19, 2016. The entire disclosures of all of the above applications are incorporated herein by reference.

TECHNICAL FIELD

The present disclosure relates to a vehicle-mounted warning system in which a warning lamp on a meter panel is turned on when an abnormality occurs on vehicle.

BACKGROUND ART

In vehicle, when an engine oil runs short, or abnormality occurs in a charge system, a warning lamp on a meter panel, for example, an oil pressure warning lamp, or a charge warning lamp, etc. lights up or blinks. When the warning lamp lights up or blinks on the meter panel, a driver thinks "something to indicate is appeared. I am worried", and the driver cannot concentrate on driving.

In Patent Document 1, when the warning lamp on the meter panel is turned on, a system in which a content explanation of the warning, or how to cope with the warning etc. is indicated on a display of a navigation device is described. However, in the above system, when the warning is generated during a route guidance by the navigation device, a description of the warning, or a description of how to cope with the warning is suddenly displayed on the display halfway along the route guidance. For this reason, the driver is disturbed by the lighting of the warning lamp on the meter panel, and a mental state of the driver may be further confused, since the display on the display of the navigation device suddenly changes. Finally, there is also a fear that it may interfere with driving and the like.

PRIOR ART LITERATURES

Patent Document 1: Japanese Patent Publication 2006-193138

SUMMARY OF INVENTION

It is therefore an object of the present disclosure to provide a vehicle-mounted warning system that can minimize a situation in which the driver is mentally shaken, when an abnormality regarding the lighting etc. of the warning lamp on the meter panel occurs.

A first embodiment of the present disclosure provides a vehicle-mounted warning system in which a warning lamp on a meter panel is turned on, or blinked when an abnormality occurs on vehicle. The vehicle-mounted warning system has a detection unit that detects a mental turmoil of a driver and a notification unit that notifies the driver of a warning content of the lighted or blinking warning lamp and how to cope with the warning when the mental turmoil of the driver is detected.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
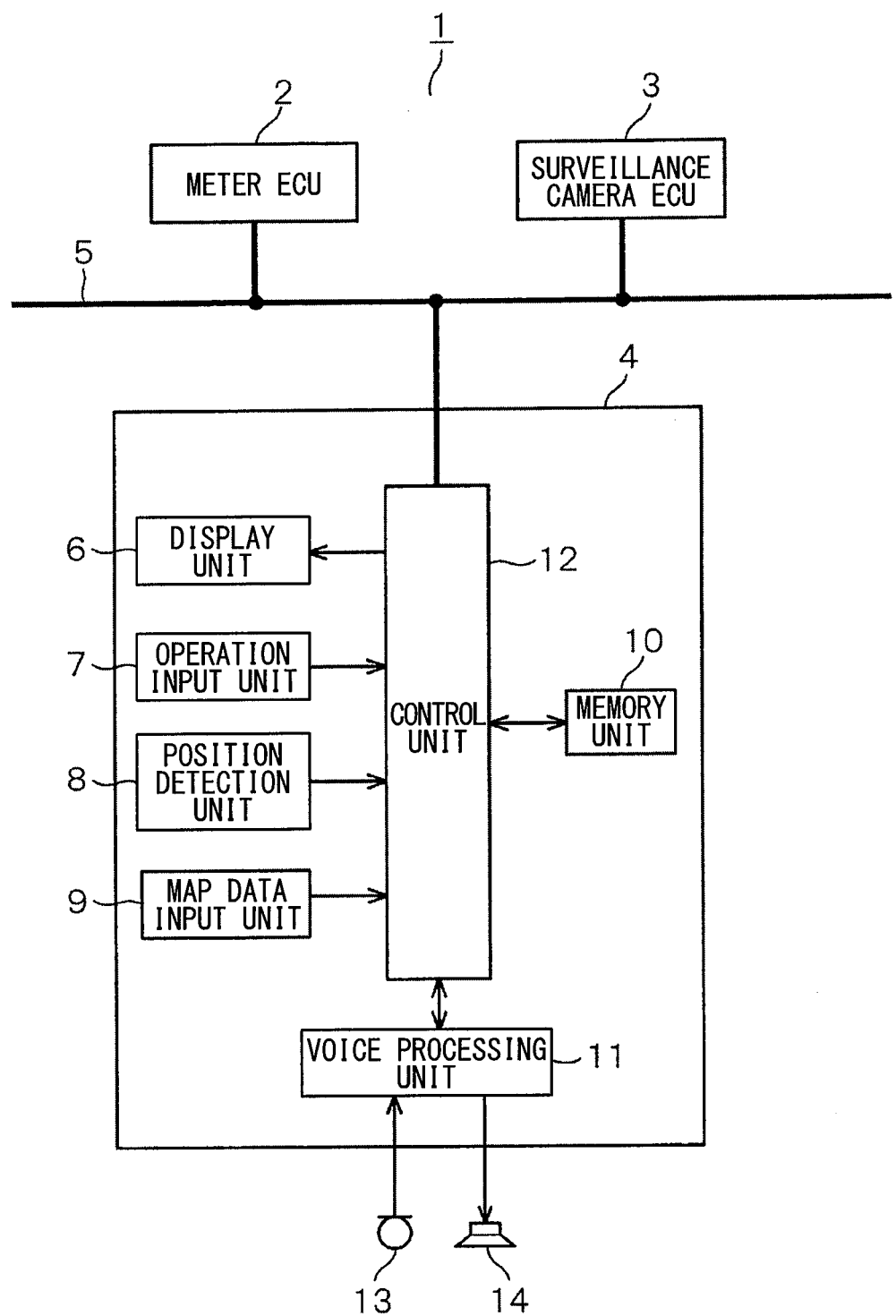
FIG. 1 is a block diagram of a vehicle-mounted warning system in a first embodiment.

Hereinafter, the first embodiment is explained with reference to FIGS. 1 to 6. As shown in FIG. 1, a vehicle-mounted warning system 1 of the present embodiment has a meter ECU 2, a surveillance camera ECU 3, a navigation device 4, a vehicle-mounted LAN 5 to which these ECUs 2, 3, and the navigation device 4 are connected. The meter ECU 2 receives various malfunction detection signals transmitted from various ECUs mounted on the vehicle through the vehicle-mounted LAN 5, and turns on or blinks a warning lamp (for example, an oil pressure warning lamp, a charge warning lamp, etc.) on a meter panel in accordance with the received malfunction detection signals.

Figure 2:
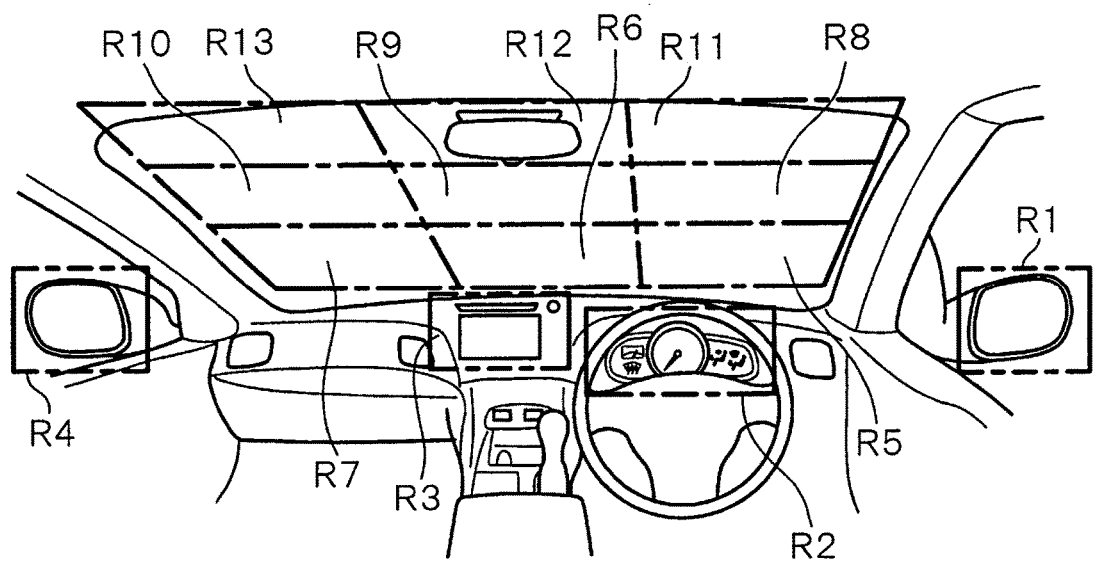
FIG. 2 is a diagram illustrating first region divisions of a cockpit of a vehicle.

The surveillance camera ECU 3 has a camera which photographs a face of the driver and an upper body thereof, etc., and an image information processing unit which performs an image recognition processing on the image date photographed with the camera. The surveillance camera ECU 3 detects a direction of a line of sight of the driver or a direction of the driver's face, etc. by performing the image recognition processing on the image data of the driver photographed with the camera, and detects where the driver is viewing an instrument panel of the vehicle and a periphery of a windshield (namely, cockpit). In this case, for example, as shown in FIG. 2, the instrument panel and the periphery of the windshield are divided into a plurality of regions R1 to Rn, and the surveillance camera ECU 3 detects to which of the regions R1 to Rn the viewpoint of the driver is located. In the configuration shown in FIG. 2, when it is determined that the viewpoint of the driver is located in the region R2, it can be determined that the driver is gazing at the meter panel, that is, the warning lamp. The surveillance camera ECU 3 is configured to transmit the detection information such as the direction of the line of sight of the driver, the direction of the driver's face, the position of the view point, and the like to the navigation device 4 through the vehicle-mounted LAN 5.

Figure 3:
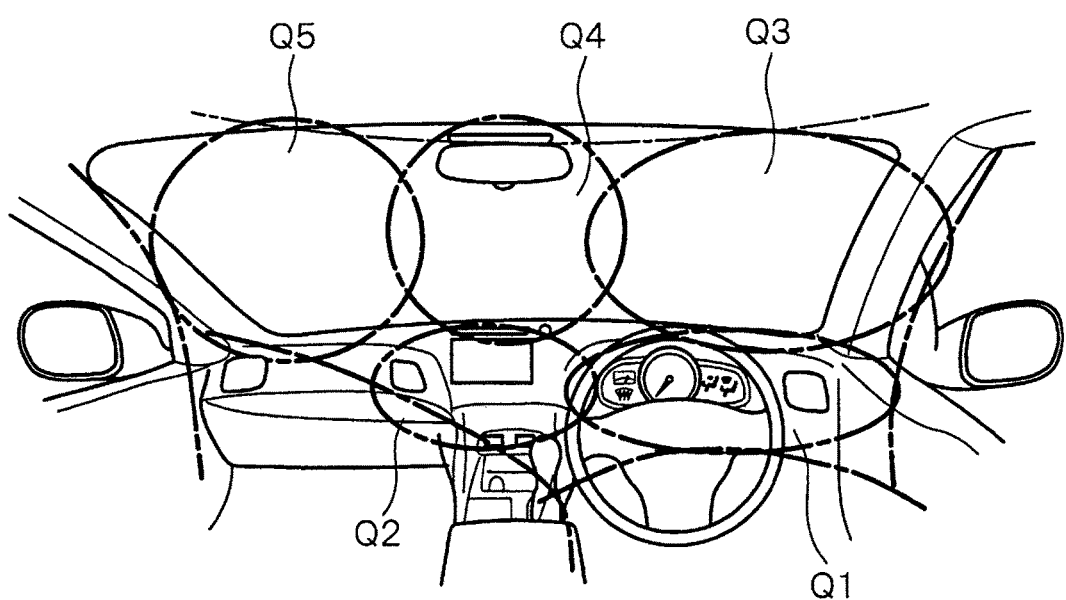
FIG. 3 is a diagram illustrating second region divisions of a cockpit of a vehicle.

Instead of dividing the inside of the cockpit into regions as shown in FIG. 2, for example, as shown in FIG. 3, the cockpit may be divided into a plurality of regions Q1 to Qn, and it may be configured to detect to which of the regions Q1 to Qn the viewpoint of the driver is positioned.

The navigation device 4 has a display unit 6, an operation input unit 7, a position detection unit 8, a map data input unit 9, a memory unit 10, a voice processing unit 11, a control unit 12 and so on. The display unit 6 is composed of, for example, a liquid crystal display device and an organic EL display device, and displays various types of information (for example, various messages, various kinds of display relating to navigation, etc.) based on an instruction from the control unit 12. On the screen of the display unit 6, a touch switch (for example, a touch panel) is provided.

The operation input unit 7 has mechanical switches provided around the peripheral of the touch switch or the display unit 6, and detects the operation of the switch by the user, and outputs the operation detection signal to the control unit 12. Further, the operation input unit 7 includes a talk switch which starts the voice recognition processing. The control unit 12 analyzes the operation detection signal input from the operation input unit 7 and identifies the operation content by the user.

The position detection unit 8 is provided with a geomagnetism sensor, a gyroscope, a speed sensor, a GPS receiver, etc. which are not shown and are well-known, and detects preciously the current position of the vehicle. In addition, an acceleration sensor etc. which detects acceleration may be added. The position detection unit 8 outputs the information on the current position of the vehicle to the control unit 12. The map data input unit 9 inputs a road map data, a voice recognition dictionary etc. by using a mass information storage media, such as CD-ROM, DVD-ROM, a hard disk, and a nonvolatile semiconductor memory etc. The control unit 12 performs the navigation processing based on the current position information of the vehicle obtained from the position detection unit 8, and the map data obtained from the map date input unit 9, etc.

The storage unit 10 is composed of a nonvolatile storage medium such as a hard disk drive or an SD memory, for example, and has a storage area for storing various data. The storage unit 10 may be built in the navigation device 4 or may be configured to use an external storage medium detachable from the navigation device 4.

The control unit 12, a microphone 13, and a speaker 14 are connected to the voice processing unit 11. The voice processing unit 11 performs well-known voice input processing, voice output processing, music output processing, and the like. When inputting a voice uttered by a user (such as a driver, for example) from the microphone 13, the voice processing unit 11 performs the voice processing on the input voice data and outputs it to the control unit 12. Further, when inputting voice data, music data, sound data, and the like from the control unit 12, the voice processing unit 11 outputs the input voice data, music data, sound data and the like from the speaker 14.

The control unit 12 is mainly composed of a microcomputer having a CPU, a ROM, a RAM, an I/O bus, and the like. The control unit 12 controls the overall operation of the navigation device 4 according to a computer program stored in a built-in ROM or the storage unit 10. The control unit 12 has a route search function for searching for a route from the current position of the vehicle to the destination, a route guidance function for searching the route from the current location to the destination, and route guidance along the set route, and a the destination setting function for setting a designation by operating the operation input unit 7.

Further, the control unit 12 receives various abnormal detection signals output from various ECUs mounted on the vehicle via the vehicle-mounted LAN 5, and has a warning occurrence determination function which determines whether or not the warning lamp on the meter panel is turned on or blinked, that is, a warning is occurred or not. Furthermore, the control unit 12 has a voice recognition function of performing voice recognition processing on the user's voice input via the microphone 13 and the voice processing unit 11 based on the voice recognition dictionary of the map data input unit 9. It is to be noted that the voice recognition process is normally executed when the user presses the talk switch. However, when it is determined that the warning has occurred, even if the talk switch is not pressed, that is, the voice recognition processing is automatically and continuously performed by turning on a continuous voice recognition mode.

The control unit 12 also receives information on the direction of the line of sight of the driver detected by the surveillance camera ECU 3 via the vehicle-mounted LAN 5, information on the direction of the driver's face, and information on the area in the cockpit where the viewpoint is located, and the like. Further, the control unit 12 has a function of detecting that the driver is mentally disturbed (or confused) based on the voice recognition result of the driver's voice, the information on the direction of the line of sight of the driver, the information on the direction of the driver's face, the information as to which area in the cockpit the viewpoint is located. Then, when detecting that the driver is mentally disturbed, the control unit 12 has a function of presenting the contents of the warning etc. to the user. Further, the control unit 12 has a function of determining whether or not it is a word that the driver emits when the mind of the driver is upset while the warning is generated. Namely, the word in which the voice recognition result of the driver's utterance is "what's that?". The control unit 12 has functions as a detection part, a notification part, a gaze detection part, and a voice detection part.

Next, the operation of the navigation device 4 with the above configuration, that is, the warning indication control of the control unit 12 will be described with reference to FIG. 4 to FIG. 6. The flowchart of FIG. 4 shows the contents of the warning indication control of the control unit 12.

Figure 4:
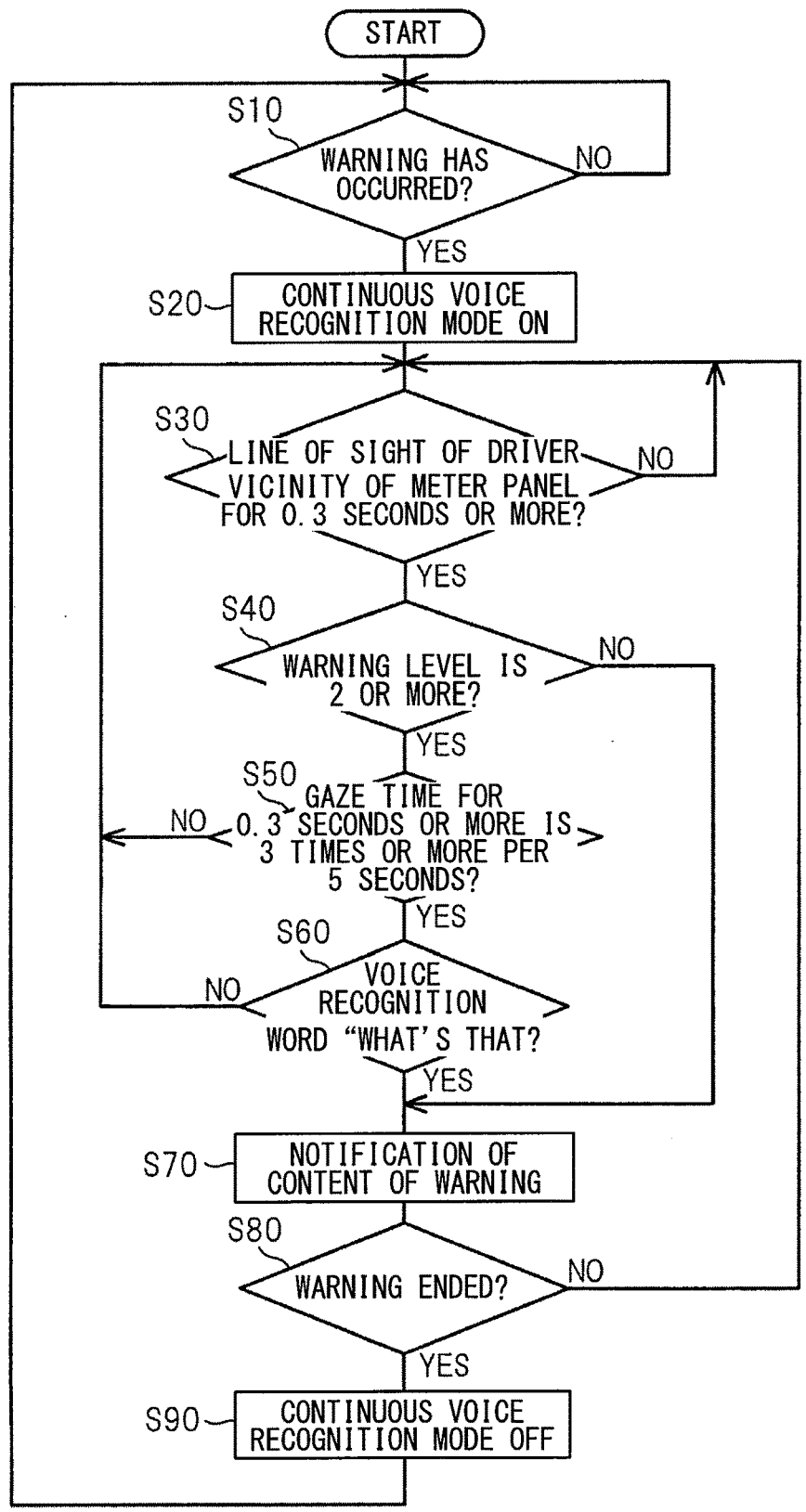
FIG. 4 is a flow chart of a warning indication control.
Figures 5, 6:
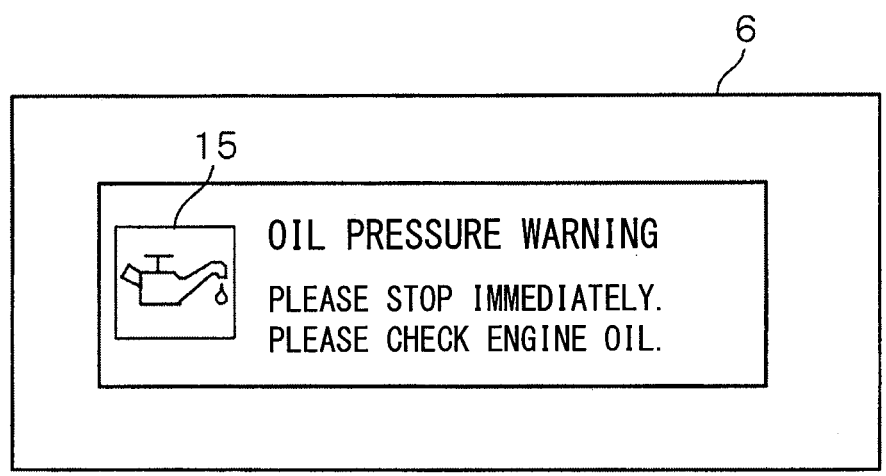
FIG. 5 is a diagram illustrating a table which shows a relation between a warning lamp and a warning level.
FIG. 6 is a diagram illustrating an example of a display mode of an explanation which describes contents of the warning, etc.

Firstly, in step S10 of FIG. 4, the control unit 12 determines whether or not the warning lamp on the meter panel is turned on or blinked, that is, whether or not a warning has occurred, based on the abnormal detection signal received via the vehicle-mounted LAN 5. Here, when no warning has occurred, the process proceeds to "NO", and the determination of step S10 is continued. In step S10, when the warning has occurred (YES), the process proceeds to step S20. The control unit 12 turns on the continuous voice recognition mode, and automatically and continuously performs the voice recognition processing on the user's voice input via the microphone 13.

Subsequently, the process proceeds to step S30, the control unit 12 receives the direction of the line of sight of the driver, the direction of the driver's face and the information of the position of the viewpoint transmitted from the surveillance camera ECU 3 via the vehicle-mounted LAN 5 and check the gaze and viewpoint etc. of the driver. Thereby, it is judged whether or not the driver has seen the vicinity of the meter panel, for example, 0.3 seconds or more. Here, when the driver does not see the vicinity of the meter panel for, for example, 0.3 seconds or longer, the process proceeds to "NO", and the judgment in step S30 is repeated.

In step S30, when the driver sees the vicinity of the meter panel for, for example, 0.3 seconds or more (YES), the process proceeds to step S40, and the control unit 12 determines whether the warning level of the generated warning is, for example, 2 or more. The warning level is set as shown in the table of FIG. 5, for example, the warning level 1 has a high degree of risk, the warning level 2 has a medium degree of risk, the warning level 3 has a low risk. In step S40, if the warning level is not equal to or less than 2 (NO), the process goes to the step S70, because the warning level is 1 and the risk level of the generated warning is high. Incidentally, the processing in step S70 and subsequent processing will be described later.

If the warning level is equal to or more than 2 in the above step S40 (YES), since the warning level is 2 or 3 and the risk level is not high, the process proceeds to step S50. In step S50, based on information such as the viewpoint of the driver output from the surveillance camera ECU 3, the control unit 12 determines whether the number of the panel gaze behavior which the driver views the vicinity of the meter panel for 0.3 seconds or more is for example, 3 times or more per 5 seconds. In the case of this configuration, the warning contents are not immediately presented (for example, notified by display or voice) just because the driver is gazing at the meter panel, when the panel gaze behavior is executed for more than the set number of times (for example, three times) within a predetermined time (for example, 5 seconds), the warning contents are presented.

In the above mentioned step S50, if the number of the panel gaze behavior in which the driver views the vicinity of the meter panel for 0.3 seconds or more is less than 3 times per 5 seconds (NO), the process returns to step S30. In the above mentioned step S50, if the number of the panel gaze behavior in which the driver views the vicinity of the meter panel for 0.3 seconds or more is 3 times or more per 5 seconds (YES), the process proceeds to step S60.

In step S60, the control unit 12 determines whether or not the voice recognition result of the driver's utterance is the word such as "what's that?" etc. In this case, it is judged whether other than the word "what's that?", the words such as "what's this?", "What's this warning?", "Is this warning?", "A red signal?", or "Why does it shine?" etc., namely the words that the driver emits when the mind of the driver is upset while the warning is generated, is voice-recognized.

In the above-mentioned step S60, if the voice recognition result of the driver's utterance is not the word such as "What's that?" etc. (NO), the process returns to step S30. Moreover, in the above-mentioned step S60, if the voice recognition result of the driver's utterance is the word such as "What's that?" which is the word that the driver emits when the mind of the driver is upset while the warning is generated (YES), the process proceeds to step S70.

In this step S70, the control unit 12 displays a display mode (for example, a figure, an image, a description, etc.) for explaining the contents of the warning, a display mode (for example, a figure, a mark, an image and a description Sentence etc.) for explaining how to cope with the warning to the driver, that is, informs the driver of them. In this case, the control unit 12 displays the respective display modes on the display unit 6 of the navigation device 4. An example of a display mode displayed on the display unit 6 is shown in FIG. 6. As shown in FIG. 6, a warning lamp that is lit on the meter panel, for example, a mark 15 (such as a symbol) of a hydraulic warning lamp is displayed, and "oil pressure warning" is displayed as the content of warning, and furthermore, "Please stop immediately, please check engine oil." is displayed as how to cope with the warning. In the case of a configuration in which a display device is provided on the meter panel, it is preferable to display the respective display mode etc. in the display device on the meter panel. Furthermore, the control unit 12 is configured to output the message portion in each of the display modes etc. from the speaker 14 by voice. In this case, it is preferable to carefully output a sound when outputting the message portion as voice, so as to calm the driver's disturbance. Also, before voice output of the message portion, words to suppress driver's upset such as "The warning lamp is on. Please calm down. Explain warning contents and how to cope with the warning." may be output by voice.

Then, the process proceeds to Step S80, and the control unit 12 determines whether or not the warning has ended, that is, whether or not the warning lamp is turned off. Here, when the warning continues (NO), the process returns to step S30, and the above-described control is repeated. When the warning has ended (YES) in the above step S80, the process proceeds to step S90, and the control unit 12 turns off the continuous voice recognition mode. As a result, the continuous voice recognition mode is canceled, and after that, when the user (for example, the driver) presses the talk switch as usual, the voice recognition processing is executed. After step S90, the process returns to step S10, and the above-described control is repeated.

In the present embodiment having such a configuration, when the warning lamp on the meter panel lights up or blinks, the mental turmoil of the driver is detected, and when the mental turmoil of the driver is detected, the content of the warning relating to the lighting or blinking waning lamp, or how to cope with the warning is notified to the driver. According to this configuration, when the mental turmoil of the driver is detected, the driver is informed of the warning contents of the warning lamp that is turned on or blinked for the first time, or how to cope with the warning. Accordingly, it is possible to prevent as much as possible a situation where the driver is mentally upset, when an abnormality such as turning on the warning lamp on the meter panel occurs.

In addition, in the above embodiment, when detecting the mental turmoil of the driver, the surveillance camera ECU 3 detects the direction of the line of sight of the driver, the direction of the face direction, and the like, and the driver's point of sight gazes at the meter panel. And the control unit 12 in the navigation device 4 recognizes the voice uttered by the driver by the voice recognition, and detects that the recognized voice is the word emitted by the driver when the driver's mind is upset. According to this configuration, it is possible to accurately detect the mental turmoil of the driver.

In addition, in the above embodiment, when the time during which the driver's point of sight is gazing at the meter panel is equal to or longer than the set time, for example, 0.3 second or longer, the detection control is executed to determine whether the driver's mind is upset. So, it is possible to prevent the detection control from being executed when the driver only looks at the meter panel, that is, when the driver is not so upset.

Further, in the above embodiment, in consideration of the warning level of the warning lamp that is turned on or blinked, when the warning level is high (for example, when the warning level is 1), the warning content of the warning lamp that is turned on or blinked, or how to deal with the above warning is instantly notified to the driver. According to this configuration, when the warning having high risk is generated, the driver can know the content of the warning promptly.

In the above embodiment, when the warning does not have a high risk warning level and the number of executions in the panel gaze behavior when the driver's point of sight is gazing at the meter panel for a predetermined time or longer, reaches or exceeds the set number of times (for example, 3 times) within a predetermined time (for example, 5 seconds), the detection control as to whether or not the mind of the driver is upset is continued. According to this configuration, the mental turmoil of the driver can be detected more accurately.

Furthermore, in the above-described embodiment, when the warning does not have a high risk warning level and the number of executions in the panel gaze behavior when the driver's point of sight is gazing at the meter panel for a predetermined time or longer, reaches or exceeds the set number of times, and further the voice of the driver is detected as the word emitted by the driver when the driver's mind is upset, it is judged that a mental turmoil of the driver is detected. So, the driver is notified of the warning contents of the warning lamp that is turned on or blinked for the first time, or how to cope with the warning. According to this configuration, it is possible to detect more accurately mental turmoil of the driver, and at the same time to inform the driver of the warning contents and how to cope with the warning, when the mental turmoil of the driver is detected.

Further, in the above-described embodiment, the voice recognition processing is automatically and continuously executed, when the warning lamp is turned on or blinked. Therefore, when the warning occurs, it is possible to execute automatically and continuously the voice recognition processing of the driver's voice, even if the driver does not press the talk switch. Furthermore, in the above-described embodiment, the continuous voice recognition mode is turned off, when the warning lamp is turned off, that is, when the warning is ended. Therefore, it is possible to prevent the useless continuation of the voice recognition processing with high load.

In the above embodiment, the function of the voice recognition processing is incorporated in the navigation device 4, but the present invention is not limited to this configuration, and a vehicle-mounted ECU dedicated to the voice recognition processing is provided and this vehicle-mounted ECU is configured to connect to the vehicle-mounted LAN 5. In the above embodiment, the surveillance camera ECU 3 is additionally provided, but instead of this configuration, the function of the surveillance camera ECU 3 may be built in the navigation device 4. In the above-described embodiment, the function of the warning presentation control is incorporated in the navigation device 4, but the present disclosure is not limited to this configuration, and the function of the warning presentation control is incorporated in another vehicle-mounted ECU, and the display such as the content of the warning, or how to cope with the warning or the like may be displayed on the display of the display ECU connected to the vehicle-mounted LAN 5.

Although the present disclosure has been described in accordance with the embodiments, it is understood that the present disclosure is not limited to the embodiments and structures. The present disclosure encompasses various modifications and variations within the equivalent scope. In addition, various combinations and forms, as well as other combinations and forms including only one element, more than one, or less, in them are also within the scope and idea of the present disclosure.

What is claimed is:

1. A vehicle-mounted warning system in which a warning lamp on a meter panel is turned on or blinked when an abnormality occurs in a vehicle, comprising:

a detection unit configured to detect a mental turmoil of a driver, when the warning lamp is turned on or blinked; and a notification unit configured to notify the driver of a content of the warning of the turned on or blinked warning lamp or how to cope with the warning thereof, when the mental turmoil of the driver is detected, wherein the detection unit, in order to detect the mental turmoil, has a gaze detection part configured to detect that a viewpoint of the driver is gazing at the meter panel by detecting a direction of a line of sight of the driver, or a the direction of the driver's face, and a voice detection part configured to detect that a voice recognized by voice recognition as the driver's voice and a word emitted by the driver when the driver has mental turmoil.

2. The vehicle-mounted warning system according to claim 1, wherein the detection unit is configured to execute a detection processing whether the has mental turmoil, when the time during which the driver's line of sight is gazing at the meter panel is equal to or longer than a set time.

3. The vehicle-mounted warning system according to claim 2, wherein the detection unit is configured to notify instantly the driver of the content of the warning of the lit or blinking warning lamp or how to cope with the warning thereof by means of the notification unit, when a warning level is high, in consideration of the warning level of the turned on or blinked warning lamp.

4. The vehicle-mounted warning system according to claim 3, wherein the detection unit is configured to continue a detection control as to whether or not the driver has mental turmoil, when the warning does not have a high risk warning level and a number of executions in a panel gaze behavior when the driver's line of sight is gazing at the meter panel for a predetermined time or longer reaches or exceeds a number of times within a second predetermined time.

5. The vehicle-mounted warning system according to claim 4, wherein the detection unit is configured to notify the driver of the content of the warning of the warning lamp that is turned on or blinked, or how to cope with the warning by means of the notification unit, when the warning does not have a high risk warning level and the number of executions in the panel gaze behavior when the driver's line of sight is gazing at the meter panel for a predetermined time or longer, reaches or exceeds the set number of times, and further the word emitted by the driver when the driver has mental turmoil is detected by the voice detection part.

6. The vehicle-mounted warning system according to claim 1, wherein the voice detection unit is configured to execute continuously a voice recognition processing, when the warning lamp is turned on or blinked.

* * * * *